March 19, 1946.  E. A. JOHNSON ET AL  2,396,702
WATER STOP DEVICE FOR ELECTRICAL CABLES
Filed May 5, 1942  4 Sheets-Sheet 4
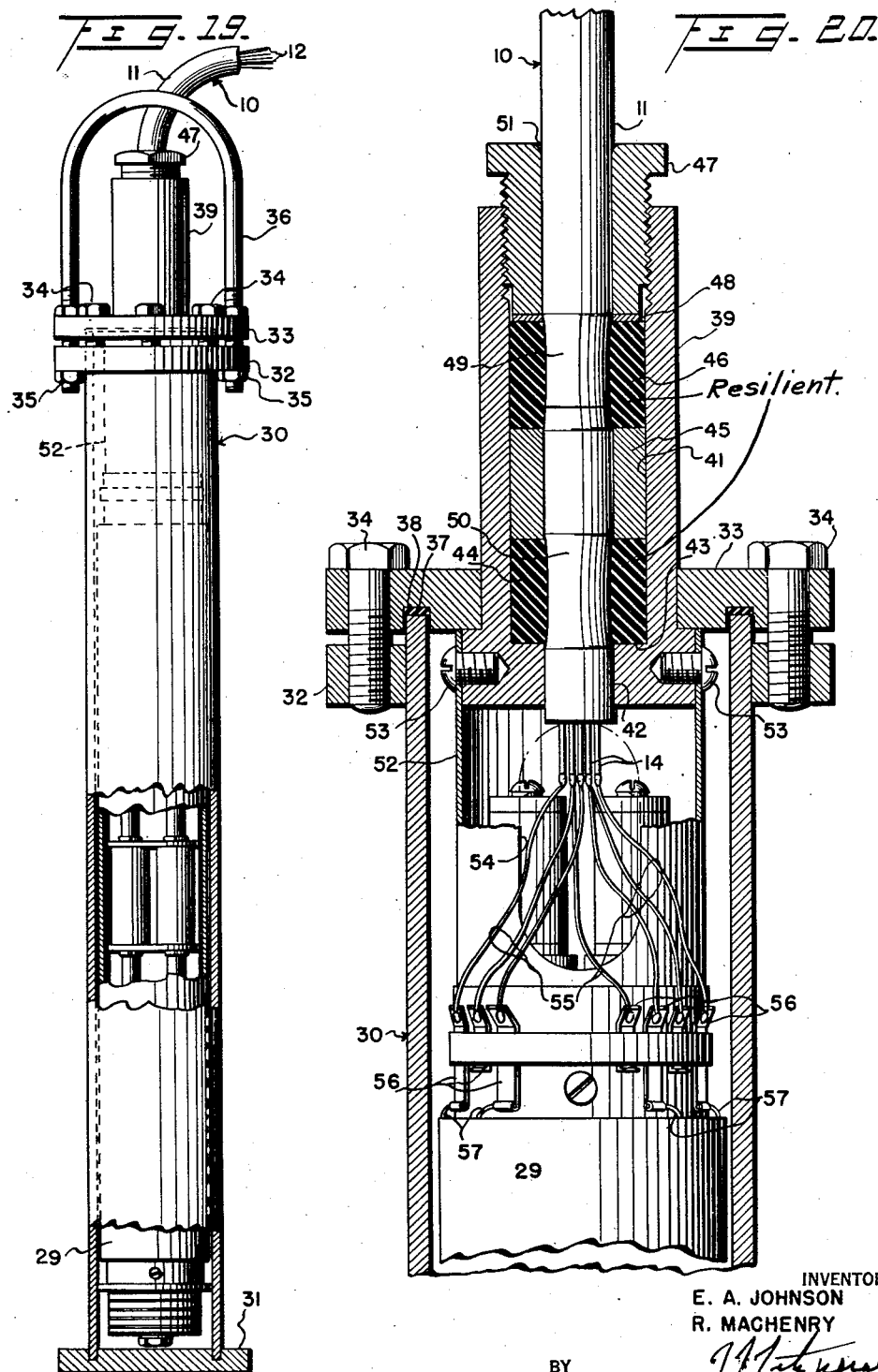
INVENTORS
E. A. JOHNSON
R. MACHENRY
BY
ATTORNEY Patented Mar. 19, 1946

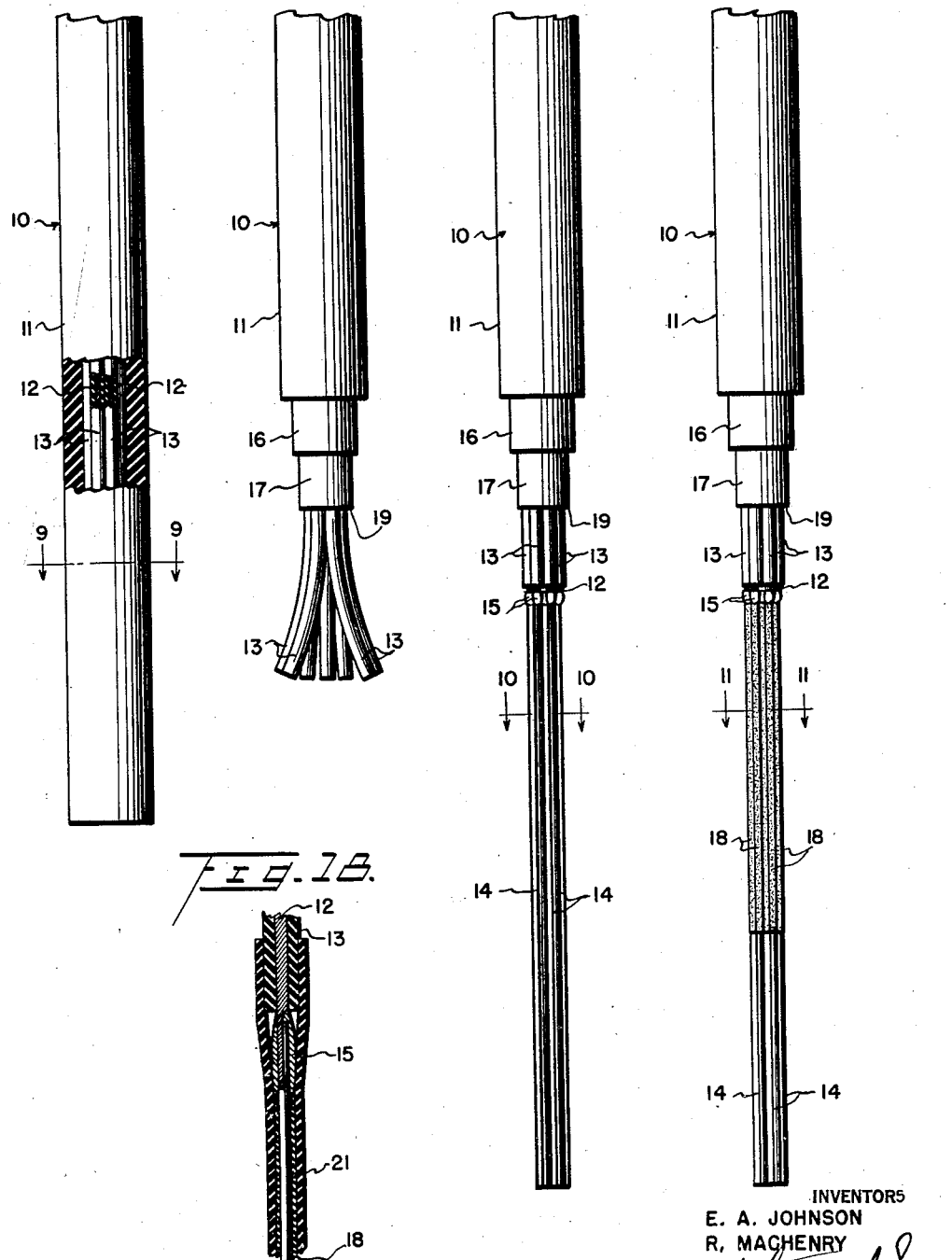

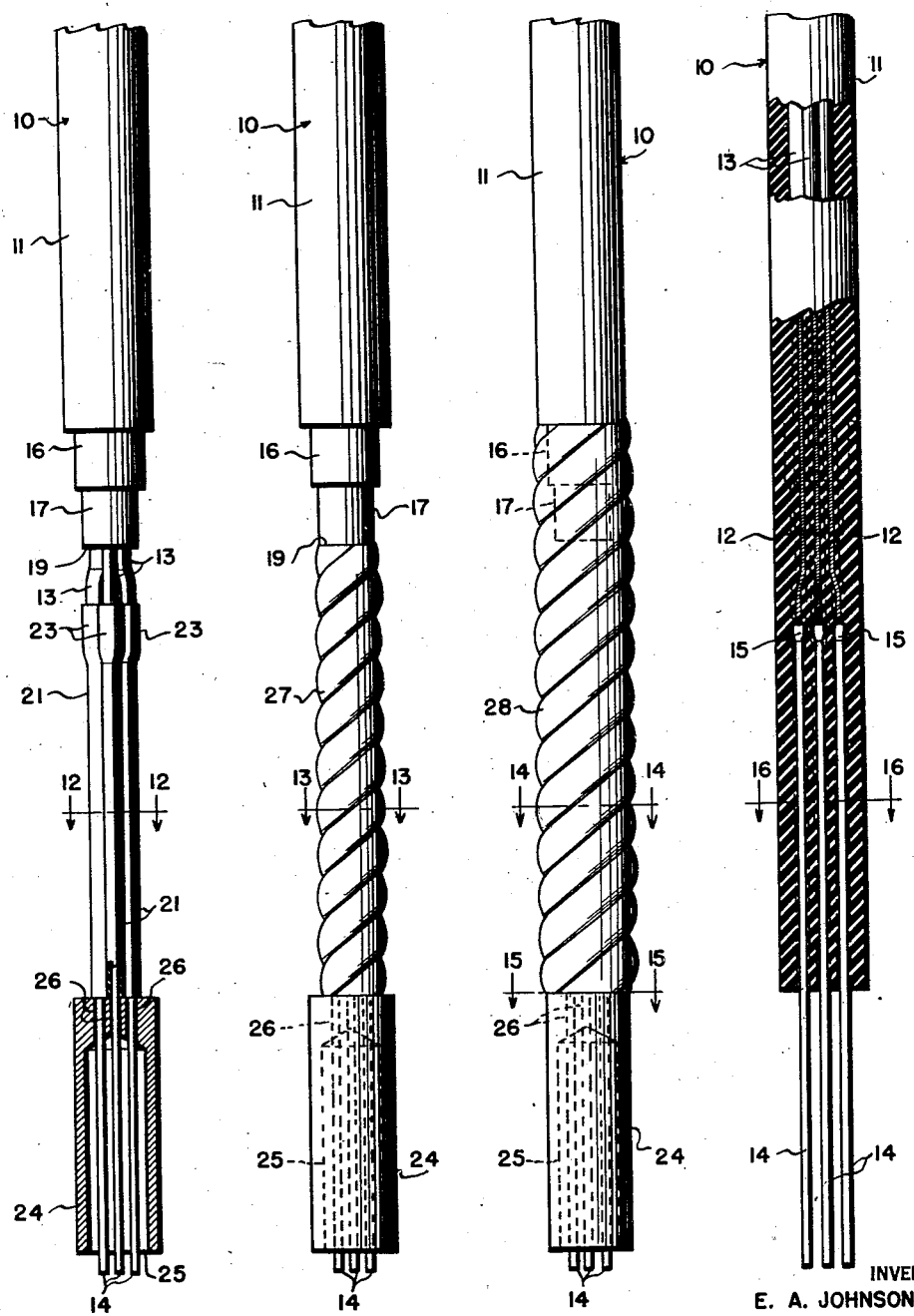

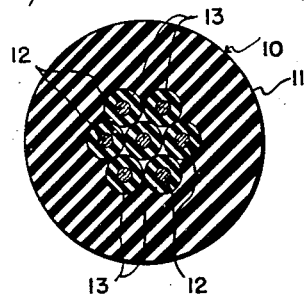
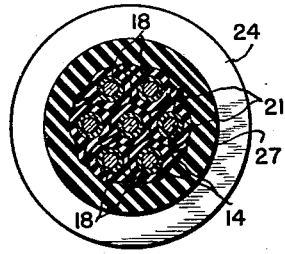
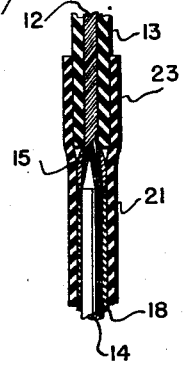
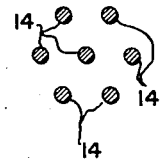
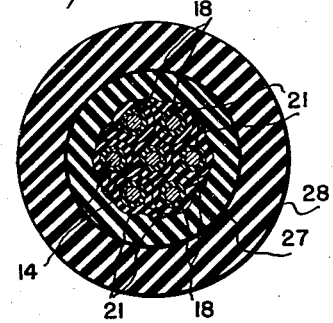
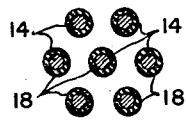
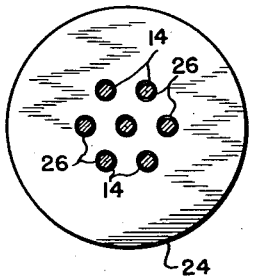
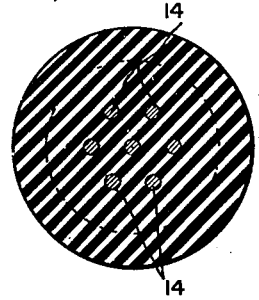
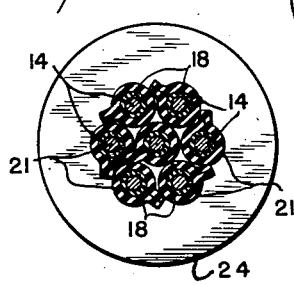

2,396,702

UNITED STATES PATENT OFFICE 2,396,702

WATER STOP DEVICE FOR ELECTRICAL CABLES

Ellis A. Johnson, Chevy Chase, Md., and Richard MacHenry, Washington, D. C.

Application May 5, 1942, Serial No. 441,800

11 Claims. (Cl. 174—77)

(Granted under the act of March 3, 1883, as amended April 30, 1928; 370 O. G. 757)

This invention relates to water stop devices for electrical cables. More specifically, the invention relates to a water stop device for an electrical cable adapted to be submerged within a body of water in which a watertight connection is established between each of the electrical conductors within the cable and a casing to which the cable is secured.

In devices heretofore proposed for establishing a watertight joint between a flexible electrical cable having a plurality of stranded conductors therein and a casing through which the cable extends, considerable difficulty has been experienced in establishing and maintaining a watertight connection between the conductors within the cable and the casing as a result of leakage of water within the cable insulation sufficiently to enable the water to come into contact with one or more of the stranded conductors and thus to gain entrance within the casing by following the interstices between the strands of the cable conductors, particularly when the casing is submerged at a considerable depth within the water.

The water stop device of the present invention includes a plurality of solid conductors connected respectively to the stranded conductors within the cable and having means for electrically insulating each of the solid conductors with respect to the remaining conductors, the insulating means including a yieldable sleeve about the conductors in sealed relation to the cable insulating sleeve thereby providing an arrangement in which there is no possibility of the seepage or leakage of water past the solid conductors, the arrangement including a new and improved means for sealing the yieldable sleeve with respect to the casing. The improved water stop is particularly adapted for use with measuring and detecting instruments arranged on or within the bed of a body of water for measuring changes in the magnetic field caused by a vessel moving within the vicinity of the measuring instruments, the measuring instruments hereinafter being referred to as magnetometers. Each magnetometer is usually arranged within a water-tight casing, hereinafter referred to as a magnetometer casing, of suitable construction adapted to exclude water from the magnetometer which might otherwise interfere with the accuracy of the measurements obtained therefrom.

One of the objects of the present invention is the provision of a new and improved water stop for an electrical cable possessing all of the advantages of devices heretofore proposed for this purpose and in which the foregoing disadvantages have been eliminated.

Another of the objects is the provision of a new and improved water seal for preventing the entrance of water within a casing adjacent an electrical cable extending through the casing into the water.

A still further object is the provision of a new and improved device of the character disclosed which will be economical to manufacture, reliable in operation and which possesses all of the qualities of simplicity of construction and durability.

Still other objects, advantages and improvements will be apparent from the following description taken in connection with the accompanying drawings of which:

Fig. 1 is a view in elevation partly broken away of a submarine cable suitable for use with the present invention;

Fig. 2 is a view of the cable of Fig. 1 with the insulation partly removed;

Fig. 3 shows a plurality of solid conductors joined to the cable of Fig. 2;

Fig. 4 shows the solid conductors of Fig. 3 partly coated with rubber cement;

Fig. 5 is a view showing rubber insulation wrapped about the solid conductors of Fig. 4, the conductors being held in an alined position by a detachable fixture;

Fig. 6 shows an inside rubber wrapping about all of the conductors in abutting relation with the cable insulation;

Fig. 7 shows an outside wrapping of rubber between the cable insulation and the fixture prior to vulcanization;

Fig. 8 shows the cable after vulcanization with the fixture removed;

Fig. 9 is a view of the cable taken along the line 9—9 of Fig. 1;

Fig. 10 is a view in section of the solid conductors taken along the line 10—10 of Fig. 3;

Fig. 11 is a view taken along the line 11—11 of Fig. 4;

Fig. 12 is a view partly in section taken along the line 12—12 of Fig. 5;

Fig. 13 is a view partly in section taken along the line 13—13 of Fig. 6;

Fig. 14 is a view in section taken along the line 14—14 of Fig. 7;

Fig. 15 is a view partly in section taken along the line 15—15 of Fig. 7;

Fig. 16 is a sectional view taken along line 16—16 of Fig. 8;

Fig. 17 is a fragmentary view in elevation somewhat enlarged and partly in section showing a preferred form of electrical connection between one of the stranded conductors and a solid conductor suitable for use with the present invention.

Fig. 18 is a fragmentary view somewhat enlarged of another form of electrical connection adapted for use with the present invention;

Fig. 19 is a view partly broken away and partly in section of a water stop device in accordance with a preferred embodiment of the invention; and, Fig. 20 is a greatly enlarged fragmentary view partly broken away and partly in section of the device of Fig. 19.

Referring now to the drawings in which like numerals of reference are employed to designate like parts throughout the several views and more particularly to Fig. 1 thereof on which is shown a submarine cable indicated generally by the numeral 10 having a flexible rubber cable sheath or covering 11 within which is arranged a plurality of stranded electrical conductors 12. Each electrical conductor is composed of a plurality of strands of wire, as is well known in the electrical art, twisted together thereby to provide a conductor having a considerable degree of flexibility, each of the stranded conductors 12 being covered with a tube or sleeve of rubber insulation 13 thereby to maintain the conductors electrically insulated from each other. From the foregoing, it will be noted that the cable 10 is adapted to be flexed and is therefore particularly suitable for use with devices arranged within a body of water in which it is desired to establish an external electrical connection to the devices and prevent the entrance of water or moisture into the casing within which the devices are enveloped.

In the arrangement of the present invention the flexible stranded conductors 12 are soldered or otherwise secured to a corresponding number of solid conductors or rods 14 as at 15, Fig. 3, whereby any moisture which may penetrate the sheath 11 of the cable 10 sufficiently to come into contact with the stranded conductors 12 thereof is prevented from gaining entrance to the aforesaid devices at the point of juncture of the electrical cable with the devices by reason of the provision of solid conductors in the manner illustrated. The end portion of the cable sheath 11 is somewhat reduced in diameter as at 16 and 17 by removing a portion of the rubber sheathing in any suitable manner as by a grinding process thereby to improve the bond between the sheath 11 of the cable and the added rubber sealing portion vulcanized thereto. The solid conductors 14 and flexible conductors 12 are coated with rubber cement 18, the rubber cement extending preferably about that portion of the sheath 11 in which the diameter thereof has been reduced by the aforesaid grinding process, and over the end 19 of the cable sheath.

A strip or sheet 21 of rubber is folded about each of the solid conductors generally in the manner illustrated on Figs. 5 and 12 with the edge portions of the sheeting brought together in a folded abutting joint extending preferably inward from the conductors thereby to increase the quantity of insulating material between the conductors 14 when the vulcanizing process is completed. The rubber strip 21 extends over the joint between the solid and the flexible conductors as at 23, Fig. 5, preferably somewhat overlapping the insulating rubber sleeves 13 arranged about the conductors 12. The rods 14 are maintained in parallel space relation during the wrapping and vulcanizing processes by an assembly tool or fixture 24 preferably cylindrical in shape and having an aperture 25 therein in communication with a plurality of apertures 26 within which the solid conductors or rods 14 are arranged. After a sufficient period of time has elapsed for the coating of rubber cement to become dry, the conductors 14 and rubber sheeting 21 thereabout are wrapped snugly with a band or strip 27 of material known in the trade as inside vulcanizing compound, the wrapping extending uniformly from the assembling tool 24 to the lower end 19 of the cable sheath 11 generally in the manner of Fig. 6.

A second band or wrapping 28 of material known in the trade as outside vulcanizing compound is wrapped about the inside wrapping 27 and the portions 16 and 17 of the cable sheath 11 generally in the manner of Fig. 7 to a diameter somewhat greater than the diameter of the cable sheath 11. The portion of the cable 11 to be vulcanized and the wrapping 28 are placed within a mold heated to a suitable temperature such, for example, as a temperature of 290 to 300 degrees Fahrenheit and allowed to remain and vulcanize for a suitable period of time such, for example, as twenty minutes. At the expiration of this period of time the mold is removed from the cable, the vulcanizing material 27 and 28 having been vulcanized to the cable sheath 11 generally in the manner of Fig. 8 to such a degree that the vulcanizing compound is homogeneous with and practically indistinguishable from the cable sheath. The assembly tool 24 is withdrawn from the rods 14, the rods now being sealed to the cable sheath and having the general alined appearance illustrated on Fig. 8.

Whereas the rod 14 is shown on Fig. 17 preferably tapered to a point to facilitate the connection of the rod with the stranded conductor 12 without substantially increasing the diameter of the rod at the junction thereof with the stranded conductor, it will be noted that this has been done by way of illustration only and that any well known arrangement suitable for the purpose may be employed for joining the flexible conductor to the end of the rod 14 such, for example, as the arrangement shown on Fig. 18 in which the end portion of the rod 14 has been cut away to substantially the diameter of the rod thereby providing a recessed portion within which the flexible conductor 12 is soldered or brazed. Furthermore, it will be understood that, if desired, the end portion of the rod 14 may be provided with a slot or aperture axially arranged therein within which the flexible conductor 12 is adapted to be secured.

On Fig. 19 is disclosed the cable 10 employed with a magnetometer device 29 in accordance with a preferred embodiment of the invention, the magnetometer being arranged within a casing or support such, for example, as the type disclosed in the copending application of J. F. G. Miller and R. MacHenry, Serial No. 429,410, filed February 3, 1942, for Means for installing magnetic detecting devices and the supports therefor. The magnetometer support comprises a tubular casing 30 adapted to be arranged within or on the bed of a body of water and having a search coil or pair of magnetometer coils inserted therein by means of which signal indications are applied to an indicating or measuring instrument by means of the submarine cable 10 connected thereto and to the magnetometer or search coils, as the case may be. The casing 30 is sealed at the lower end thereof by the cap or plate 31 secured thereto in any suitable manner as by threading or brazing the parts together and provided at the upper portion thereof with an outwardly extending flange or annular portion 32 to which is clamped the circular plate or cap 33 as by the bolts 34 and nuts 35 secured to the U-shaped member 36. A packing ring or gasket 37, Fig. 20, arranged within an annular recessed portion 38 of the plate 33 is preferably provided to insure a watertight connection between the casing 30 and the plate 33 secured thereto. There is provided within the plate 33 a cylindrical member 39 secured thereto as by welding the parts together and having a cylindrical recessed portion 41 therein in coaxial alinement with an aperture 42 of lesser diameter than the recessed portion 41 within which the submarine cable 10 is arranged. The recessed portion 41 of the member 39 terminates at the lower end thereof at a shoulder 43 adapted to engage a flexible annular packing member 44. There is also provided a rigid annular spacing member 45 of material suitable for the purpose such, for example, as brass in abutting relation with the packing member 44 adapted to slide within the cylindrical member 39. There is also provided a resilient annular packing member 46 in abutting relation with the spacing member 45, adapted to be compressed by the packing nut 47 threaded within the member 39 in the manner illustrated, a washer 48 being preferably arranged between the packing nut and the packing member 46. The flexible packing members 44 and 46 are composed of any material suitable for the purpose such, for example, as rubber adapted to be compressed by the packing nut 47 thereby to seize and grip the cable 10 as at 49 and 50 respectively sufficiently to compress the cable insulation into watertight relation with respect to the rods 14 extending therefrom, thereby absolutely preventing the possibility of the leakage or seepage of water past the rods 14 in the event that, for any reason, the seal between the rods 14 and the vulcanized compound should otherwise be defective. The joint between the vulcanizing compound and the cable 10 should preferably be arranged within the packing member 46 whereby the pressure of the packing member 46 additionally seals the joint between the vulcanizing compound and the cable 10 and thus the entrance of water or moisture within the cable at the junction thereof with the vulcanizing compound is prevented in the event that the vulcanized joint therebetween has otherwise been imperfectly established or subsequently damaged sufficiently to cause or permit the seepage of water therebetween.

By employing an incompressible spacing member 45 intermediate the packings 44 and 46, the packing member 44 is caused to be compressed to substantially the same degree as the packing member 46 for the reason that the pressure of the packing member 46 against the spacing member 45 is transmitted without substantial loss to the packing member 44. Furthermore, the pressure applied to the packing member 44 causes the packing member to be forced under pressure into intimate contact with the recessed portion 41 of the member 39 and also to be pressed tightly against the shoulder 43 whereby the possibility of leakage or seepage of water between the packing member 44 and the member 39 is prevented. An arrangement is thus provided in which the cable 10 is hermetically sealed to the casing 30 and the possibility of the entrance of water or moisture within the casing is absolutely prevented. The packing nut 47, it will be noted, is preferably provided with a rounded portion 51 at the point of emergence of the cable 10 therefrom whereby the cable may be flexed without damage or injury thereto by the packing nut.

In the arrangement of Figs. 19 and 20 the magnetometer search coils are supported preferably by a sleeve 52 secured to the lower portion of the member 39 as by the screws 53, the sleeve having a suitable aperture 54 therein within which are arranged the flexible conductors 55 preferably soldered to the lower ends of the rods 14 for establishing an electrical connection between the rods and the terminals 56, from whence the circuit is continued by way of the conductors 57 to the search or magnetometer coils.

While the invention has been described in connection with a specific example which is adapted for the use set forth in the description, it is to be understood that the reference to such use shall not limit the invention thereto and that various changes may be made in the mechanism employed within the principles of this invention, and that any words of description that may be imparted to the claims from the specification are not to be considered as words of limitation.

The invention herein disclosed and claimed may be manufactured and used by or for the Government of the United States of America for governmental purposes without payment of any royalties thereon or therefor.

What is claimed as new and desired to be secured by Letters Patent of the United States is:

1. A rubber covered cable having a plurality of stranded electrical conductors therein, a plurality of alined conducting rods respectively soldered to one end of each of said stranded conductors, said end of each conductor having substantially the same number of strands therein as the remainder of the conductor, a plurality of strips of insulating material respectively wrapped about each of said rods, and a sleeve of flexible insulating material arranged about said strips of insulating material in homogeneous union therewith and with the rubber covering of said cable.

2. In a submarine cable comprising a rubber protecting cover having a plurality of portions of progressively decreasing diameter near the end thereof, a plurality of stranded conductors arranged within said rubber protecting cover and extending through said plurality of portions, a plurality of conducting rods respectively soldered to one end of each of said stranded conductors, said end of each conductor having substantially the same number of strands therein as the remainder of the conductor, a plurality of insulating sleeves respectively arranged about each of said rods, and means in intimate sealed contact with said plurality of portions of the rubber cover and said insulating sleeves for maintaining said rods in predetermined alined space relation with respect to each other.

3. A water stop for a submarine cable having a plurality of stranded conductors therein, a plurality of conducting rods respectively connected to said conductors, a pair of annular packing devices arranged about said cable opposite said rods, an annular spacing member intermediate said pair of packing devices and in alinement therewith, a casing having a tubular member within which said packing devices and annular spacing member are arranged, and means including a packing nut for compressing said pair of packing devices sufficiently to seal said rods hermetically to said tubular member.

4. A device of the character disclosed for sealing a submarine cable to a casing having a magnetometer therein, a rubber sleeve section intimately secured to said cable and having a plurality of conducting rods arranged therein and projecting from the end thereof, a plurality of electrical conductors respectively connected to each of said rods for electrically connecting the rods to said magnetometer, a plurality of flexible conductors arranged within said cable respectively connected to the other end of each of said rods for establishing an external electrical connection thereto, a plurality of insulating devices respectively cemented to each of said rods in intimate contact with said rubber sleeve, a cylindrical member secured to said casing, a pair of yieldable packing devices arranged within said cylindrical member within which said rubber sleeve and the end of the submarine cable are disposed, a rigid annular spacing member disposed intermediate said pair of packing devices and in alinement therewith, and means for compressing said pair of packing devices sufficiently to seal said submarine cable and rubber sleeve to said cylindrical member.

5. A device of the character disclosed for sealing a submarine cable to a casing arranged within a body of water, a detecting device disposed within said casing, a plurality of conducting rods arranged within said cable and projecting from the end thereof, a plurality of flexible conductors arranged within said cable and connected to each of said rods respectively for establishing an external electrical connection to the rods, a plurality of insulating devices respectively cemented to each of said rods, a rubber sleeve in intimate sealed contact with said insulating devices and submarine cable, a cylindrical member secured to said casing, a pair of packing devices arranged within said cylindrical member within which said rubber sleeve and the end of the submarine cable are disposed, a rigid annular spacing member intermediate said pair of packing devices and in alinement therewith, means for compressing said pair of packing devices sufficiently to seal said submarine cable and rubber sleeve to said cylindrical member, and means including a plurality of flexible conductors respectively connected to the opposite end of said rods for establishing an electrical connection between the rods and said detecting device.

6. A submarine cable comprising a rubber protecting cover having a plurality of stranded conductors arranged therein, a plurality of alined conducting rods respectively soldered to one end of each of said stranded conductors, said end of each conductor having substantially the same number of strands therein as the remainder of the conductor, a plurality of insulating sleeves arranged around each of said rods respectively and cemented thereto, and a vulcanized rubber mass of substantially the same cross sectional area as the cable arranged about said plurality of insulating sleeves in intimate sealed contact therewith and with said rubber protecting cover.

7. A submarine cable comprising a rubber protecting cover having a plurality of stranded conductors arranged therein, a plurality of alined conducting rods respectively soldered to one end of each of said stranded conductors, said end of each conductor having substantially the same number of strands therein as the remainder of the conductor, a plurality of insulating sleeves arranged around each of said rods respectively and cemented thereto, and a rubber wrapping of slightly greater cross sectional area than the cable disposed about said plurality of insulating sleeves and adapted to be vulcanized thereto and to said rubber protecting cover.

8. In a submarine cable comprising a rubber protecting cover having a plurality of sections of progressively decreasing diameter at the end portion thereof, a plurality of stranded conductors arranged within said rubber protecting cover and extending through said plurality of sections, a plurality of alined conducting rods respectively soldered to one end of each of said stranded conductors, said end of each conductor having substantially the same number of strands therein as the remainder of the conductor, a plurality of insulating sleeves arranged about each of said rods respectively and cemented thereto, a first wrapping of inside vulcanizing compound arranged about said plurality of insulating sleeves in abutting relation with the end of said rubber protecting cover, and a second wrapping of outside vulcanizing compound arranged about said first wrapping and said plurality of sections of rubber covered cable and vulcanized thereto.

9. A device of the character disclosed for sealing a submarine cable to a casing adapted to be submerged within a body of water, a plurality of conducting rods arranged within said cable and projecting from the end thereof, a plurality of flexible conductors arranged within said cable respectively connected to each of said rods for establishing an external electrical connection thereto, a plurality of insulating devices respectively arranged about each of said rods, a rubber sleeve vulcanized to each of said insulating devices and said submarine cable, a cylindrical chamber within said casing, and means including a pair of yieldable annular packing devices arranged in predetermined space relation within said chamber about said submarine cable for hermetically sealing said rubber sleeve and rods to said casing.

10. A water stop device of the character disclosed comprising a rubber covered cable having a plurality of stranded electrical conductors arranged therein, a rubber sleeve abutting said rubber covered cable and vulcanized thereto, a plurality of conducting rods arranged within said rubber sleeve in electrical connection with said stranded conductors respectively, a casing arranged within the water having a cylindrical chamber therein within which said rubber sleeve and the end portion of said submarine cable are disposed, yieldable means adapted to engage said rubber sleeve and submarine cable at the point of junction therebetween and seal the cable to said cylindrical member, and a second packing member adapted to engage said rubber sleeve opposite said conducting rods and thereby seal the rods to said cylindrical member.

11. The method of making a watertight joint for a submarine cable having a plurality of stranded electrical conductors therein comprising, soldering a plurality of rods respectively to each of said stranded conductors, insulating each of said rods from the adjacent rods, releasably securing each rod in predetermined parallel space relation with respect to each other, vulcanizing a sleeve about the insulated rods and to said submarine cable to maintain the rods in said predetermined space relation, and releasing the rods thereafter.

ELLIS A. JOHNSON.
RICHARD MacHENRY.